United States Patent [19]

Kiguchi

[11] Patent Number: 5,708,214
[45] Date of Patent: *Jan. 13, 1998

[54] KARMAN VORTEX FLOW METER

[75] Inventor: Sakae Kiguchi, Hyogo, Japan

[73] Assignee: Mitsubishi Denki Kabushiki Kaisha, Tokyo, Japan

[*] Notice: The term of this patent shall not extend beyond the expiration date of Pat. No. 5,614,681.

[21] Appl. No.: 553,901

[22] Filed: Nov. 6, 1995

[30] Foreign Application Priority Data

Apr. 21, 1995 [JP] Japan .................. 7-120832

[51] Int. Cl.$^6$ .................. G01F 1/32; G01F 1/68
[52] U.S. Cl. .................. 73/861.22; 73/202
[58] Field of Search .................. 73/861.22, 202, 73/202.5, 118.2

[56] References Cited

U.S. PATENT DOCUMENTS

| | | | |
|---|---|---|---|
| 4,571,996 | 2/1986 | Wakeman et al. | 73/202.5 |
| 4,879,898 | 11/1989 | Bamer | 73/202.5 |

FOREIGN PATENT DOCUMENTS

| | | | |
|---|---|---|---|
| 57-17864 | 1/1982 | Japan | G01P 5/01 |
| 57-86013 | 5/1982 | Japan | G01F 1/32 |
| 5-84825 | 11/1993 | Japan | G01F 1/32 |

*Primary Examiner*—Elizabeth L. Dougherty
*Assistant Examiner*—Harshad Patel
*Attorney, Agent, or Firm*—Sughrue, Mion, Zinn, Macpeak & Seas, PLLC

[57] ABSTRACT

A Karman vortex flow meter has detection passages located along a fluid flow in a duct. Flow outlets of the detection passages are disposed on an end face of a vortex generation element and flow inlets are disposed upstream from the flow outlets. Heating coils for detecting flow velocity change of a fluid caused by a negative pressure of a Karman vortex are mounted in the detection passages. A flow meter is used that lessens dust accumulation on heating coils, etc., and reliably detects Karman vortexes.

11 Claims, 7 Drawing Sheets

KARMAN VORTEX FLOW METER

BACKGROUND OF THE INVENTION

This invention relates to a Karman vortex flow meter used with internal combustion engines of vehicles, etc., for measuring the flow velocity or flow rate of a fluid and in particular to a method using heating coils, etc., for detecting Karman vortexes.

Conventional methods using heating coils for detecting Karman vortexes detect Karman vortexes occurring on a fluid directly by means of heating coils or detect a subflow produced by alternately occurring Karman vortexes.

The former method is described, for example, in Unexamined Japanese Patent Publication 57-86013 (1982) as shown in FIG. 9. The latter is described, for example, in Unexamined Japanese Patent Publication 57-17864 (1982) as shown in FIG. 10 and Unexamined Japanese utility Model Publication 5-84825 (1993) as shown in FIG. 11.

In FIG. 9, a vortex generation element 102 is installed in a duct 101 where a fluid flows and heating coils 109a and 109b are placed symmetrically in a vortex pass area downstream from the vortex generation element 102. In the structure, Karman vortexes 107 produced by a flow of fluid in the direction indicated by an arrow 110 are detected as an increase or decrease in a heating current fed into the heating coils 109a and 109b for measuring the flow velocity or quantity according to the Karman vortex period.

In FIG. 10, a heating coil 209 is put in a through hole 205 piercing both sides of a vortex generation element 202 installed in a duct 201 where a fluid flows, and a flow produced in the through hole 205 as Karman vortexes 207 occur is converted into an AC signal synchronized with the vortex occurrence using a radiation amount change of the heating coil 209. The flow velocity or quantity is measured from the frequency or period of the AC signal.

Further, in FIG. 11, pressure measurement holes 311 are made in the left and right side faces of a vortex generation element 302 mounted perpendicularly to a flow in a measurement flow passage, and are connected by a detection passage 312. A thermal flow sensor 313 is installed in the detection passage 312. In the structure, a pressure change occurs due to Karman vortexes alternately produced on the left and right of the vortex generation element 302 and a left and right alternating flow in the detection passage 312 caused by the pressure change is detected as a resistance change caused by a temperature change of the thermal flow sensor 313 for measuring the flow velocity or quantity.

In the conventional Karman vortex flow meters as described above, the following problems arise:

If heating coils are installed directly in the duct through which a fluid passes as shown in FIG. 9, when the fluid contains dust, the dust will accumulate in the heating coils as the flow meter is used for a long term. Since the accumulated dust hinders the heating coils in heat radiation, electric output of the heating coils decreases and in the end, Karman vortexes cannot be detected.

If holes are made near two vortex exfoliation points on the side faces of the vortex generation element and the detection passage is disposed so as to connect the holes as shown in FIGS. 10 and 11, Karman vortexes alternately occurring via the detection passage interfere with each other, causing Karman vortexes to sometimes occur unstably.

SUMMARY OF THE INVENTION

It is therefore an object of the invention to provide a Karman vortex flow meter which, even if the fluid to be measured contains dust, can lessen accumulation of dust on heating coils, etc., for preventing electric output of the heating coils, etc., from lowering and makes Karman vortexes always constant in any flow quantities.

According to the invention, there is provided a Karman vortex flow meter comprising a vortex generation element being disposed in a duct into which a fluid flows for generating Karman vortexes, a detection passage being arranged along a fluid flow in the duct and having a flow outlet disposed on an end face of the vortex generation element and a flow inlet disposed upstream from the flow outlet, and detection means being placed in the detection passage for detecting a flow velocity change of a fluid in the detection passage caused by a negative pressure of the Karman vortex.

Further, the vortex generation element is vertically installed and the flow inlet of the detection passage is disposed on an upper wall face of the duct and the flow outlet is disposed on a side face of the vortex generation element.

Furthermore, the flow outlet of the detection passage is disposed at a position near an exfoliation point of the Karman vortex and away from a boundary layer of the duct wall face.

Still further, two detection passages having flow outlets on left and right end faces of the vortex generation element are disposed and a flow inlet corresponding to the left flow outlet of the vortex generation element is located on the left of the vortex generation element upstream from the flow outlet and a flow inlet corresponding to the right flow outlet of the vortex generation element is located on the right of the vortex generation element upstream from the flow outlet.

Still further, two detection passages having flow outlets on left and right end faces of the vortex generation element are disposed and a flow inlet corresponding to the left flow outlet of the vortex generation element is located on the right of the vortex generation element upstream from the flow outlet and a flow inlet corresponding to the right flow outlet of the vortex generation element is located on the left of the vortex generation element upstream from the flow outlet, the two detection passages being crossed spatially without crossing each other.

Moreover, the detection passages, the vortex generator, and the flow inlets and flow outlets of the detection passages are integrally molded. Corners of the flow inlets are formed as edges of chamfer C 0.5 or less. Heating coils are mounted as means for detecting a flow velocity in the detection passages and the flow velocity is measured according to current change of the heating coils. The Karman vortex flow meter can further include supports for supporting the heating coils and supplying power thereto, the supports being formed of a conductive material having low thermal conductivity. The supports for supporting the heating coils are made of flat plates, which are located in parallel with a flow in the detection passages for also providing a rectification function in the detection passages. The heating coils are put on the supports with inclination in the range of 15–60 degrees with a perpendicular to the fluid flow as a basis.

In the Karman vortex flow meter as mentioned above, when a fluid containing dust is caused to flow into the duct, the fluid also passes through the detection passage in response to the fluid passing through the duct. However, dust of larger mass than the fluid is large in inertia and travels straight along the duct; it is hard to enter the detection passage disposed outside the duct and does not affect the measurement means such as the heating coil located in the detection passage. The detection passage has the flow outlet formed in the vortex generation element and the flow inlet formed upstream from the flow outlet, thereby preventing Karman vortexes alternately occurring on both sides of the vortex generation element from affecting each other, preventing vortexes from disappearing.

Since the flow inlet and flow outlet of the detection passage are formed on the top of the duct, dust in the fluid can be prevented from entering the detection passage.

In the invention, the flow outlet of the detection passage is located near an exfoliation point, maximum negative pressure occurrence point of Karman vortexes, whereby a larger pressure difference can be obtained in the detection passage and flow change caused by Karman vortexes becomes larger.

The flow outlet is placed away from the boundary layer along the duct wall face, whereby the flow caused by Karman vortexes in the detection passage becomes hard to be affected by flow stagnation along the duct wall face.

In the invention, the detection passages are placed substantially in parallel with the flow in the duct and the flow inlet and flow outlet are formed on the left (or right) and right (or left), respectively, of the center line passing through the center of the vortex generation element and parallel with the flow in the duct, whereby Karman vortexes generated left and right alternately by the vortex generation element can be detected with good sensitivity.

In the invention, the flow inlet corresponding to the left flow outlet of the vortex generation element is formed right upstream from the vortex generation element and the flow inlet corresponding to the right flow outlet of the vortex generation element is formed left upstream from the vortex generation element, whereby the Karman vortex detection precision is improved.

In the invention, the relative positions of the vortex generation element, the detection passage, and the flow inlet and flow outlet of the detection passage can be formed accurately.

In the invention, the flow inlet of the detection passage is formed as a sharp edge of C 0.5 or less, thereby making it more difficult for dust to enter the detection passage.

In the invention, a larger electric signal can be provided by using the heating coils.

In the invention, the support for supporting the heating coil is made of a conductive material having a low thermal conductivity such as an SUS material, whereby the radiation from the heating coil to the support decreases.

In the invention, the flat supports are disposed in parallel with the flow in the detection passages, whereby the flow in the detection passages is rectified and electric output of the heating coils is more stable.

In the invention, if the heating coils in the detection passages are put on the supports with inclination of 15–60 degrees from a perpendicular to the flow as a basis, even if more particulate dust of smaller amount entering the detection passage arrives at the surface of the heating coil, the dust is drifted by the flow on the surface of the heating coil and does not accumulate on the surface of the heating coil.

DETAILED DESCRIPTION OF PREFERRED EMBODIMENTS

First Embodiment

Figure 1A:
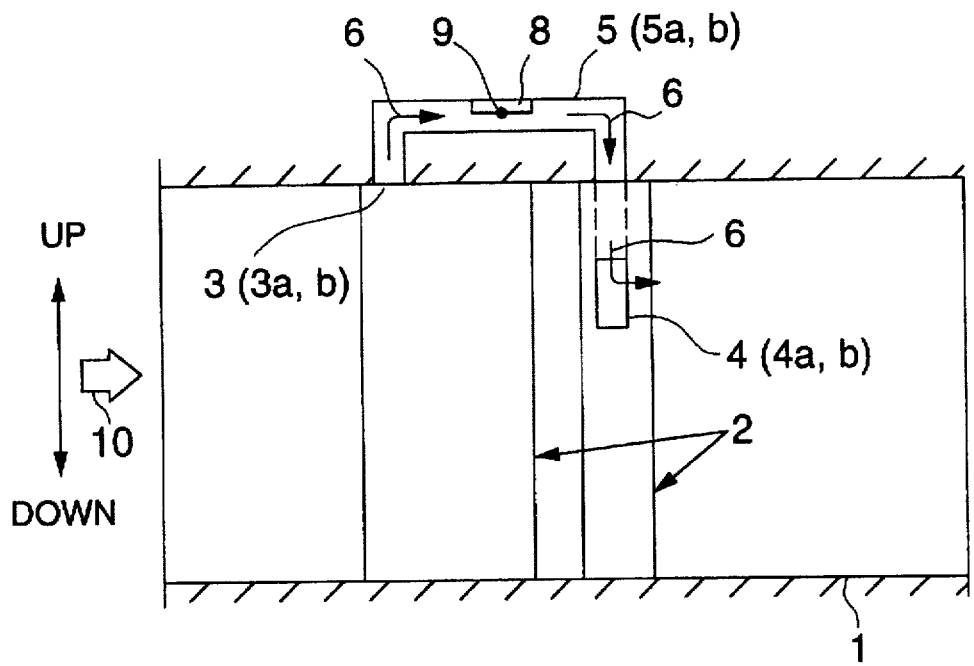
FIGS. 1A and 1B are side view and plan view showing a Karman vortex flow meter according to a first embodiment of the invention.
Figure 1B:
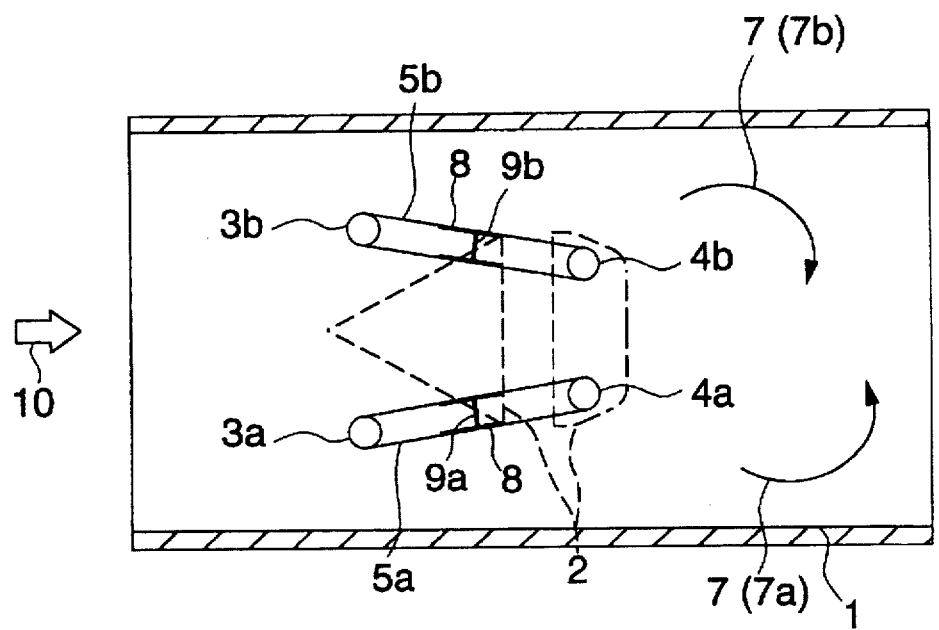

FIGS. 1A and 1B are a side view and a plan view showing a Karman vortex flow meter according to a first embodiment of the invention.

In FIG. 1A, a vortex generation element 2 is installed in a duct 1 having a square cross section into which a fluid flows and detection passages 5 are disposed along the flow direction of the duct 1. Each detection passage 5 has a flow inlet 3 formed in the top wall face of the duct 1 and a flow outlet 4 formed in the top end face of the vortex generation element 2. Supports 8 along a flow of a fluid are located in the detection passages 5 and heating coils 9 are put on the supports 8.

On the other hand, when viewed from the top of FIG. 1B, the detection passages 5 are two detection passages 5a and 5b having flow outlets 4a and 4b and flow inlets 3a and 3b. The flow outlets 4a and 4b are placed on the left and right of the center line passing through the center of the vortex generation element 2 and parallel with a flow in the duct 1 and the flow inlets 3a and 3b upstream from the flow outlets are opened to the top wall face of the duct 1. The detection passages 5a and 5b are disposed substantially in parallel with the flow in the duct 1 and corners of the flow inlets 3a and 3b are formed as edges of chamfer C 0.5 or less. Numeral 7 denotes a Karman vortex generated by the vortex generation element 2 and numeral 10 denotes the fluid flow direction.

In the Karman vortex flow meter having this structure, when a fluid flows into the duct 1 in the direction of the arrow 10, Karman vortexes 7 occur alternately on the rear of the vortex generation element 2. Assuming that a Karman vortex 7a occurs at the flow outlet 4a, a negative pressure is applied around the flow outlet 4a, whereby the fluid flows into the detection passage 5a through the flow inlet 3a higher in pressure than the flow outlet 4a. The heating coil 9a detects the fluid flow in the detection passage 5a. Next, when a Karman vortex 7b occurs at the flow outlet 4b, likewise a fluid flow occurs in the detection passage 5b and the heating coil 9b detects it. Numeral 6 denotes the fluid flow in the detection passage 5.

The magnitude of the fluid flow in the detection passage 5 caused by the Karman vortexes 7 will be discussed. FIG.

Figure 3:
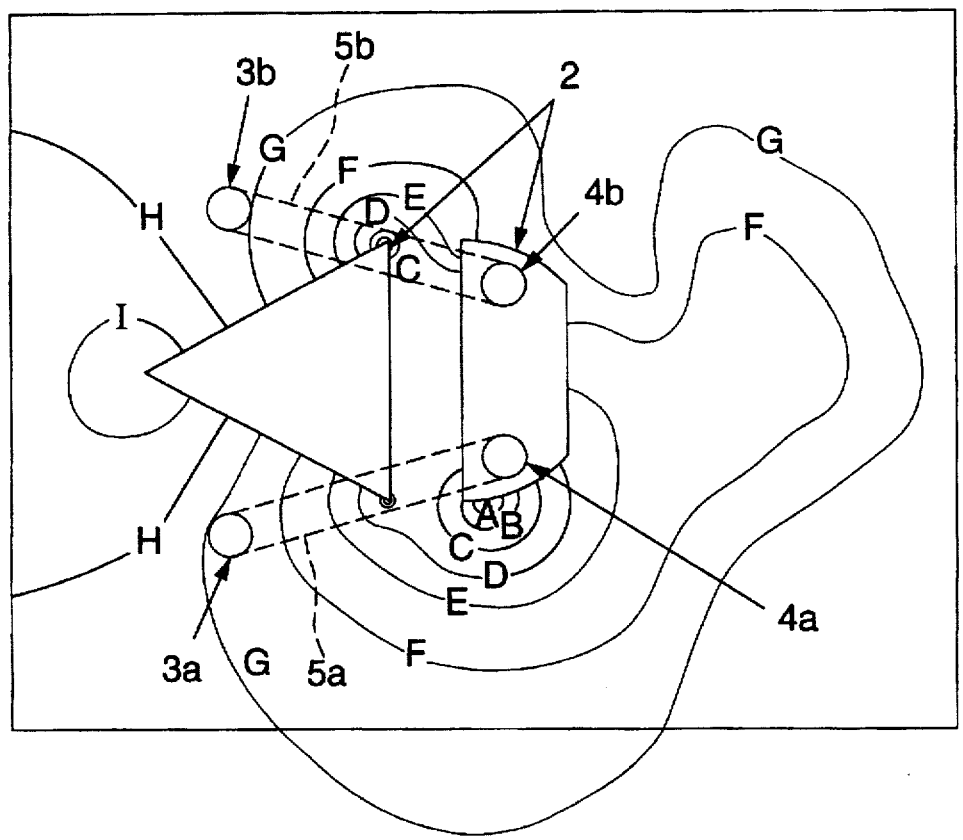
FIG. 3 is a chart showing a pressure distribution when a Karman vortex occurs.

3 is an isobaric chart on the periphery of the vortex generation element 2 when the Karman vortex 7a at the flow outlet 4a causes the negative pressure around the flow outlet 4a to become the maximum. In FIG. 3, A to H denote negative pressure levels; A is the largest negative pressure and H is the smallest negative pressure, namely, the negative pressure lessens from A to H. In the state in FIG. 3, the flow velocity in the detection passage 5a is determined by the difference between the pressure at the flow inlet 3a (≈G) and the pressure at the flow outlet 4a (≈B) and the flow velocity in the detection passage 5b is determined by the difference between the pressure at the flow inlet 3b (≈H) and the pressure at the flow outlet 4b (≈G). The detection sensitivity of the Karman vortex 7 is the difference between the heating coils 9a and 9b. Therefore, the detection sensitivity is represented by pressure expression [(G−B)−(H−G)].

Figure 4:
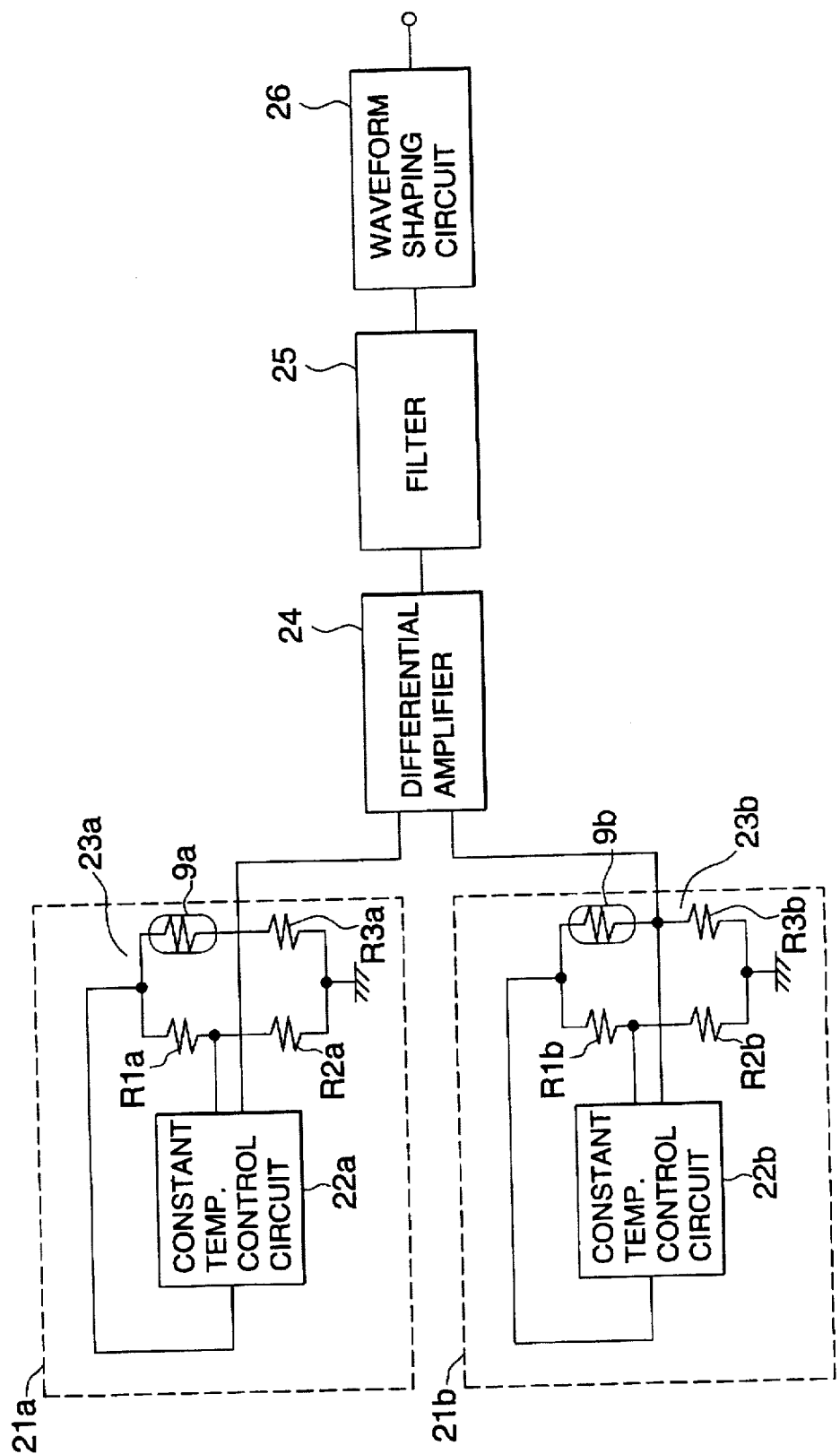
FIG. 4 is a block diagram of a detector used in the embodiment.

FIG. 4 is a block diagram showing a circuit example for using Karman vortexes to detect the flow velocity. In the figure, a vortex detector 21a (21b) consists of a bridge 23a (23b) and a constant temperature control circuit 22a (22b). The bridge 23a (23b) is made up of the heating coil 9a (9b) disposed in the detection passage 5a (5b) and fixed resistors R1a, R2a, and R3a (R1b, R2b, and R3b). The constant temperature control circuit 22a (22b) senses an unbalanced voltage of the bridge 23a (23b) and automatically adjusts current applied to the bridge 23a (23b) so as to hold the temperature (resistance value) of the heating coil 9a (9b) constant. A signal output from the vortex detector 21a (21b) is differentially amplified by a differential amplifier 24 and sent via a filter 25 for removing DC components to a waveform shaping circuit 26, which then converts it into a rectangular wave in response to the Karman vortex period.

In the embodiment, as shown in FIG. 3, the flow outlets 4a and 4b of the detection passages 5a and 5b are located near exfoliation points, maximum negative pressure occurrence points of Karman vortexes generated by the vortex generation element 2, whereby a larger pressure difference can be obtained between the flow inlet and outlet of the detection passage for detecting flow change caused by Karman vortexes more accurately. The positions of the exfoliation points of Karman vortexes can be found by experiment or simulation after the forms of the duct, vortex generation element, etc., are determined.

Second Embodiment

Figure 2:
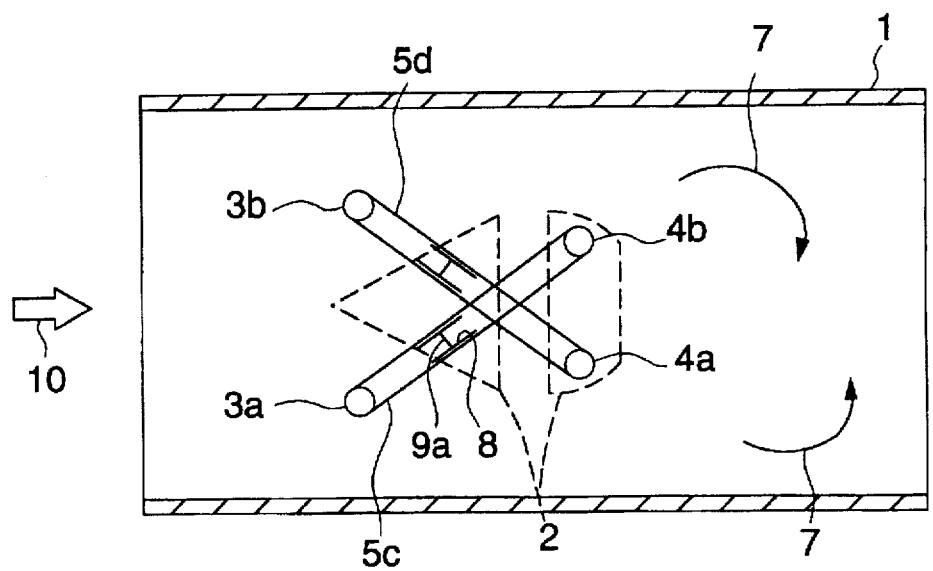
FIG. 2 is a plan view showing a Karman vortex flow meter according to a second embodiment of the invention.

FIG. 2 is a plan view showing arrangement of detection passages of a Karman vortex flow meter according to a second embodiment of the invention. A detection passage 5c is disposed between the flow inlet 3a and flow outlet 4b of the first embodiment and a detection passage 5d is disposed between the flow inlet 3b and flow outlet 4a of the first embodiment. The two detection passages 5c and 5d are crossed spatially so that they do not cross each other.

Next, detection of Karman vortexes in the second embodiment will be discussed. When Karman vortexes 7 occur as described in the first embodiment and the pressure distribution state in FIG. 3 is set, the flow velocity in the detection passage 5c is determined by the difference between the pressure at the flow inlet 3a (≈G) and the pressure at the flow outlet 4b (≈G) and the flow velocity in the detection passage 5d is determined by the difference between the pressure at the flow inlet 3b (≈H) and the pressure at the flow outlet 4a (≈B). Therefore, the detection sensitivity is represented by pressure expression [(H−B)−(G—G)]. Thus, it is seen that the second embodiment has a higher detection sensitivity than the first embodiment.

Third Embodiment

Although two detection passages 5 are disposed in the first and second embodiments, it can be expected that only one detection passage can also produce a similar effect. That is, either of the detection passages 5a and 5b in the first embodiment (FIG. 1) or either of the detection passages 5c and 5d in the second embodiment may be selected as the detection passage.

Fourth Embodiment

Figure 5:
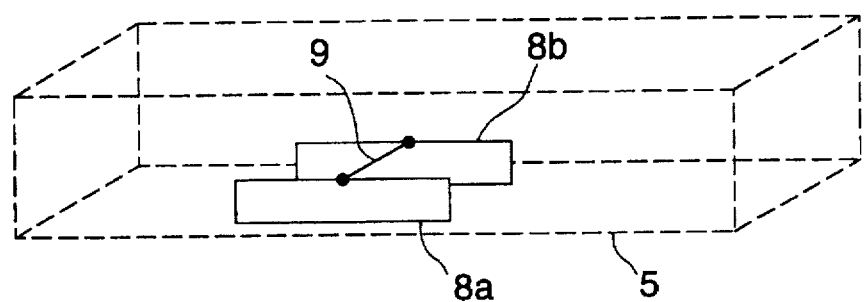
FIG. 5 is a perspective view showing pulling of a heating coil according to a fourth embodiment of the invention.

FIG. 5 is a perspective view showing an embodiment of putting of a heating coil 9 in a detection passage 5, wherein flat supports 8a and 8b are spaced from each other at a predetermined interval in parallel with the flow direction of a fluid in the detection passage 5 and the heating coil 9 is put on end faces of the supports 8a and 8b.

Although the fluid flow in the detection passage 5 normally has a large turbulence, the supports 8 of the heating coil 9 are made flat and disposed in parallel with the flow, whereby the flow is rectified and the electric output waveform of the heating coil 9 becomes stable.

The supports 8 can be made of a conductive material having low thermal conductivity such as an SUS material.

Embodiment 5

Figure 6A:
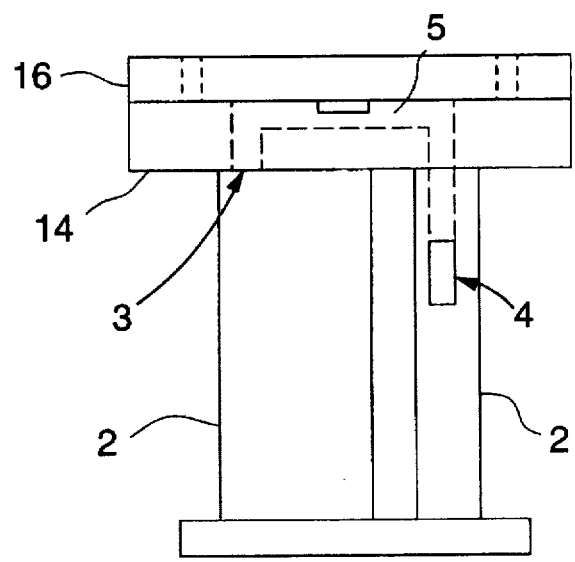
FIGS. 6A and 6B are views showing an integrally molded resin article according to a fifth embodiment of the invention.
Figure 6B:
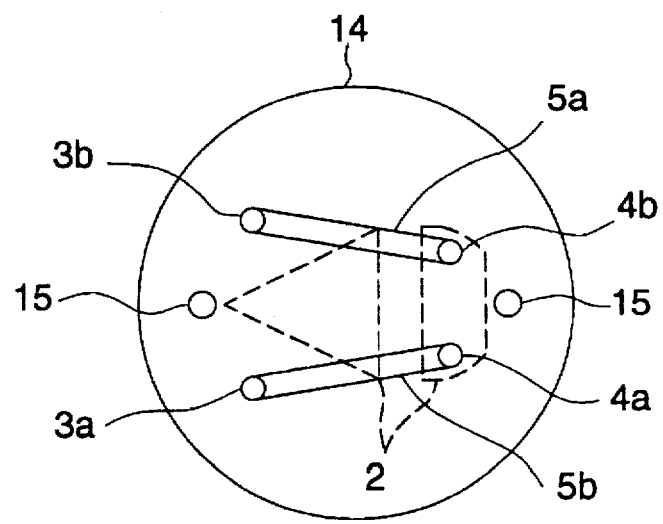

FIG. 6A is an embodiment showing a resin molded article having a vortex generator 2 and detection passages 5 molded integrally. In the figure, it comprises a pedestal 14 forming flow inlets 3 and the detection passages 5 facing the upper end of a duct, and the outflow side of the detection passages 5 is communicated with flow outlets 4 of the vortex generator 2. The flow inlets 3 are not chamfered. Numeral 16 is a lid having heating coils 9 mounted on the pedestal 14. FIG. 6B is a plan view of the pedestal 14, wherein numeral 15 is positioning protrusions formed in the pedestal 14.

Figure 7A:
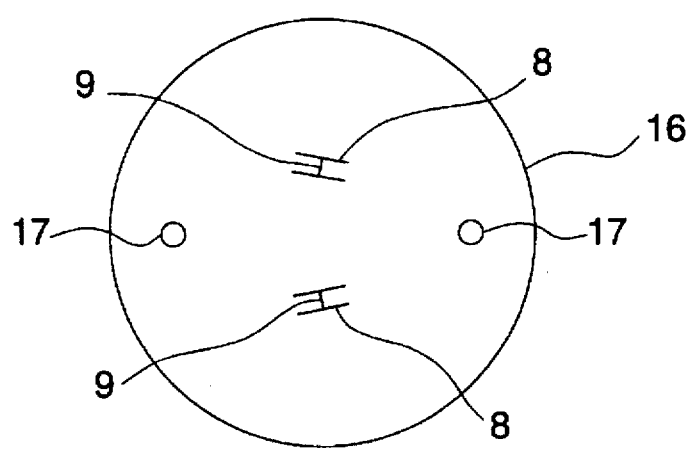
FIGS. 7A and 7B is views showing a lid in the fifth embodiment of the invention.
Figure 7B:
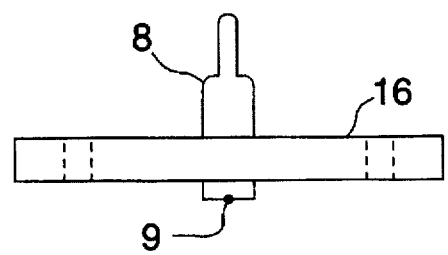

FIGS. 7A and 7B are a bottom view and a side view showing the lid 16, which is provided with supports 8 having heating coils 9. Holes 17 of the lid 16 are fitted in the protrusions 15 formed in the pedestal 14, thereby placing the heating coils 9 in the detection passages 5.

According to the embodiment, the pedestal 14 having the detection passage 5 and the flow inlets 3 is molded integrally with the vortex generator 2 by resin, thus precision of relative positions can be raised and the parts can be assembled easily.

Embodiment 6

Figure 8:
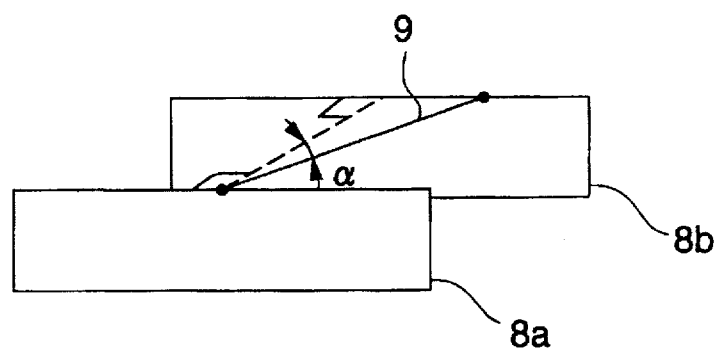
FIG. 8 is a perspective view showing pulling of a heating coil according to a sixth embodiment of the invention.
Figure 9:
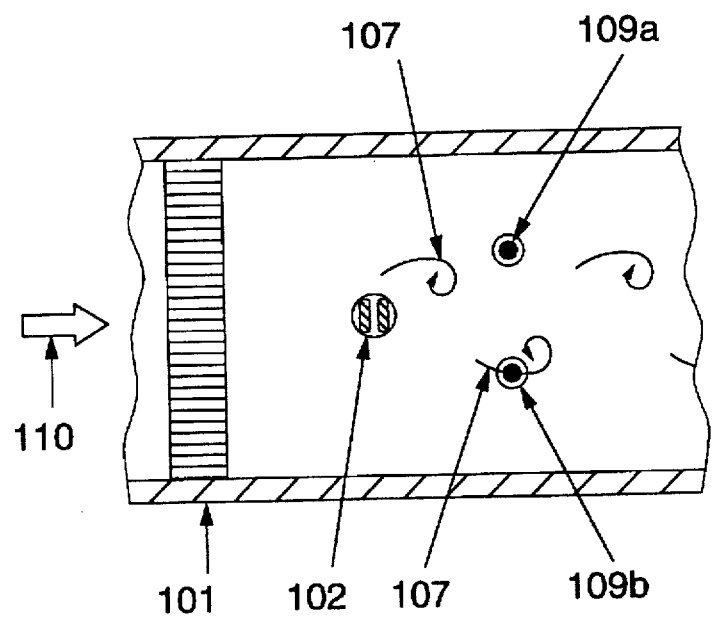
FIG. 9 is a view showing a conventional Karman vortex flow meter.
Figure 10:
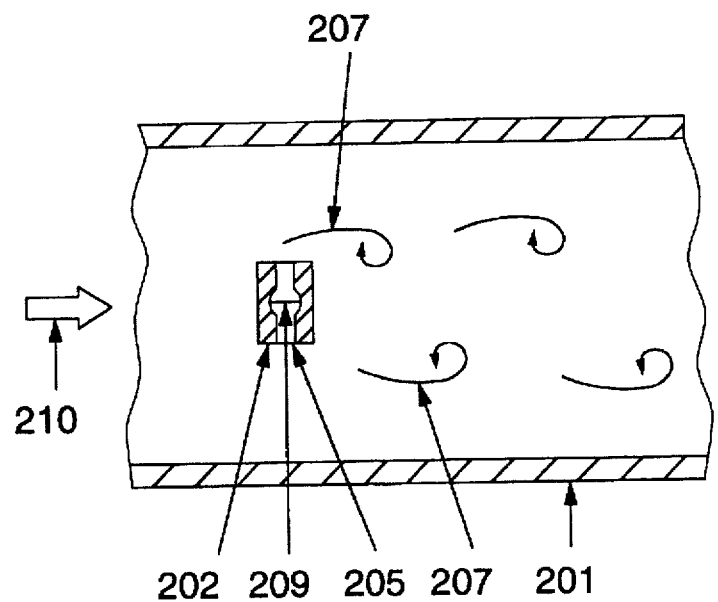
FIG. 10 is a view showing a conventional Karman vortex flow meter.
Figure 11:
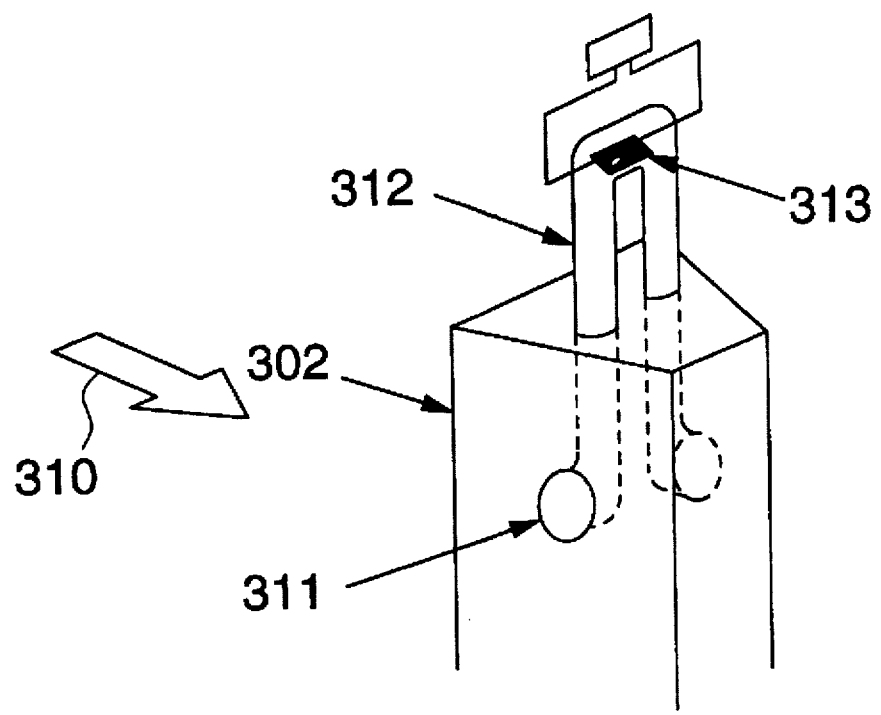
FIG. 11 is a view showing a conventional Karman vortex flow meter.

FIG. 8 shows another embodiment of the method of putting heating coils 9 on supports 8.

In the figure, the heating coil 9 is put at an angle α of 15–60 degrees with a broken line indicating a direction perpendicular to the support 8 disposed in parallel with a flow in a detection passage 5. Thus, it is hard for dust entering the detection passage 5 to accumulate on the heating coil 9.

Although the embodiments use the vortex generator 2 using poles having trapezoidal and triangular cross sections in combination, the vortex generator 2 may be of any form if it generates Karman vortexes. The heating coils 9a and 9b are used as means for detecting the flow velocity in the detection passage. However, if other sensors that can sense the flow velocity are used, a similar effect can be produced.

The invention produces the following effects:

According to the invention, the detection passage is disposed in the duct and the flow outlet of the detection passage is formed in the vortex generation element and the flow inlet is formed upstream from the flow outlet, whereby the flow in the detection passage does not adversely affect occurrence of Karman vortexes and stable flow quantity detection can be executed without destroying Karman vortexes.

Even if the fluid in the duct contains dust, it is hard for dust to enter the detection passage disposed outside the duct and does not affect the measurement means such as the heating coil mounted in the detection passage.

According to the invention, the flow inlet and flow outlet of the detection passage are formed on the top of the duct, thereby preventing dust from flowing into the detection passage.

According to the invention, the flow outlet of the detection passage is located at the exfoliation point of Karman vortexes, whereby a larger pressure difference can be obtained in the detection passage and the detection sensitivity of Karman vortexes increases.

The flow outlet is placed away from the boundary layer along the duct wall face, whereby the flow caused by Karman vortexes in the detection passage becomes hard to be affected by flow stagnation along the duct wall face.

According to the invention, Karman vortexes generated left and right alternately by the vortex generation element can be detected with good sensitivity.

According to the invention, Karman vortex detection accuracy can be improved.

According to the invention, the relative positions of the vortex generation element, the detection passage, and the flow inlet and flow outlet of the detection passage can be formed accurately.

According to the invention, the flow inlet of the detection passage is formed as a sharp edge of C 0.5 or less, thereby making it more difficult for dust to enter the detection passage.

According to the invention, a larger electric signal can be provided by using the heating coils.

According to the invention, the support for supporting the heating coil is made of a conductive material having a low thermal conductivity such as an SUS material, whereby the radiation from the heating coil to the support can be decreased for reducing power consumption.

According to the invention, the flat supports are disposed in parallel with the flow in the detection passages, whereby the flow in the detection passages is rectified and electric output of the heating coils more stabilizes.

According to the invention, the heating coils in the detection passages are put on the supports with an inclination of 15–60 degrees from the perpendicular to the flow as a basis, whereby the amount of dust accumulating on the heating coils can be decreased.

What is claimed is:

1. A Karman vortex flow meter for detecting a period of Karman vortexes to measure a flow velocity or flow rate, said flow meter comprising:

a duct into which a fluid flows;

a vortex generation element disposed in said duct to produce the Karman vortexes;

a detection passage arranged along a fluid flow in said duct and having a flow outlet disposed on a side face of said vortex generation element and a flow inlet disposed upstream from said flow outlet; and detection means placed in said detection passage for detecting variation of a flow velocity of a fluid in said detection passage caused by a negative pressure of the Karman vortex.

2. The Karman vortex flow meter as claimed in claim 1, wherein said vortex generation element is vertically installed and the flow inlet of the detection passage is disposed on an upper wall face of the duct and the flow outlet is disposed at an upper end of said side face of said vortex generation element.

3. The Karman vortex flow meter as claimed in claim 1, wherein said flow outlet of said detection passage is disposed at a position near an exfoliation point of the Karman vortex and away from a boundary layer of the duct wall face.

4. The Karman vortex flow meter as claimed in claim 1, wherein two detection passages having flow outlets on left and right end faces of said vortex generation element are disposed for detecting Karman vortexes occurring on the left and right of said vortex generation element and wherein a left flow inlet corresponding to the left flow outlet of said vortex generation element is located on the left of said vortex generation element upstream from the left flow outlet and a right flow inlet corresponding to the right flow outlet of said vortex generation element is located on the right of said vortex generation element upstream from the flow outlet.

5. The Karman vortex flow meter as claimed in claim 1, wherein two detection passages having flow outlets on left and right end faces of said vortex generation element are disposed for detecting Karman vortexes occurring on the left and right of said vortex generation element and wherein a right flow inlet corresponding to the left flow outlet of said vortex generation element is located on the right of said vortex generation element upstream from the left flow outlet and a right flow inlet corresponding to the right flow outlet of said vortex generation element is located on the left of said vortex generation element upstream from the right flow outlet, said two detection passages being crossed spatially without crossing each other.

6. The Karman vortex flow meter as claimed in claim 1, wherein said detection passages, said vortex generator, and said flow inlets and flow outlets of said detection passages are integrally molded.

7. The Karman vortex flow meter as claimed claim 1, wherein corners of said flow inlets are formed as edges of chamfer of 0.5 mm or less.

8. The Karman vortex flow meter as claimed in claim 1, wherein heating coils are mounted as means for detecting a flow velocity in said detection passages and the flow velocity is measured according to current change of said heating coils.

9. The Karman vortex flow meter as claimed in claim 8 further including supports for supporting said heating coils and supplying power thereto, said supports being formed of a conductive material having low thermal conductivity.

10. The Karman vortex flow meter as claimed in claim 9, wherein said supports for supporting said heating coils are made of flat plates, which are located in parallel with said fluid flow in said detection passages for also providing a rectification function in said detection passages.

11. The Karman vortex flow meter as claimed in claim 8, wherein said heating coils are mounted on said supports with an inclination in the range of 15–60 degrees from a direction perpendicular to the fluid flow.

* * * * *